(No Model.)
E. KRUSE.
DEVICE FOR DETECTING SEDIMENT IN PIPES.
No. 598,321. Patented Feb. 1, 1898.
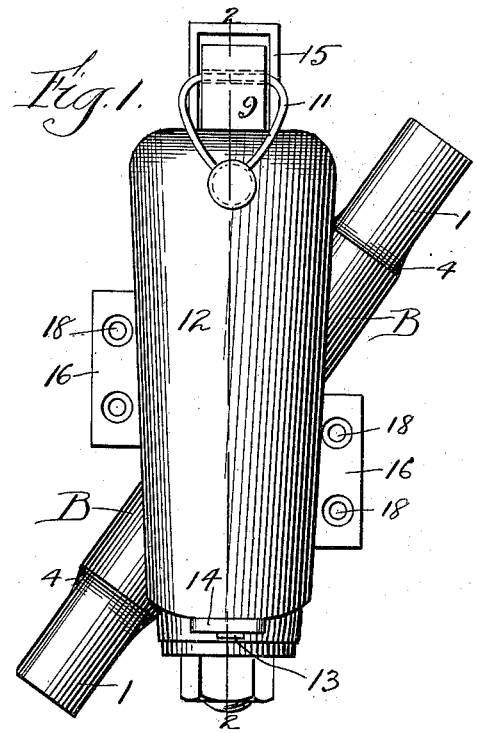
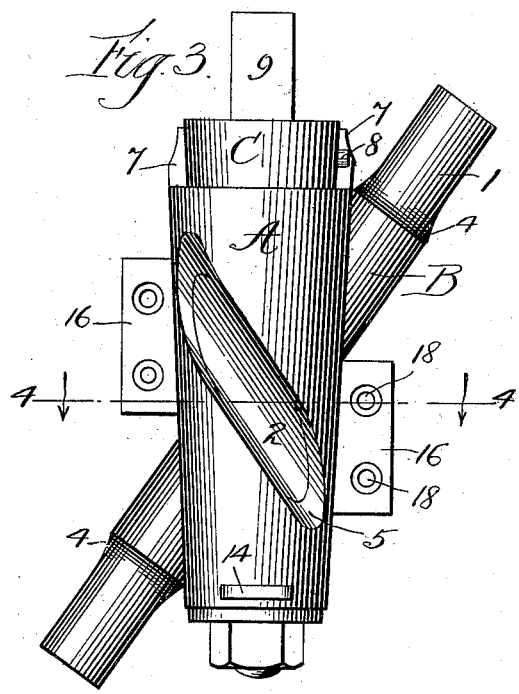
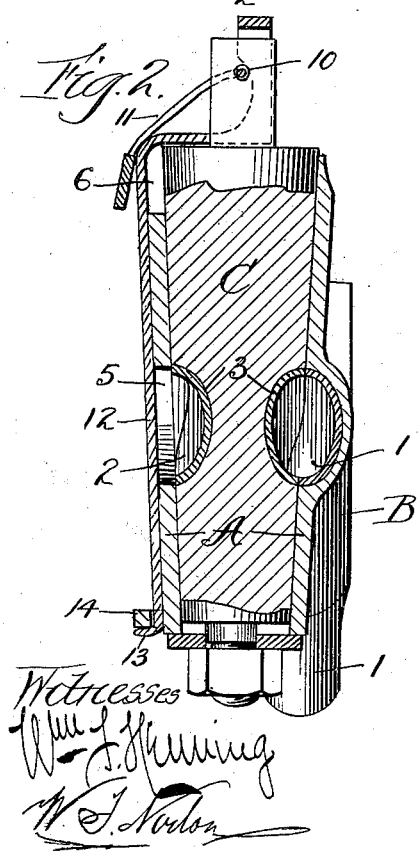
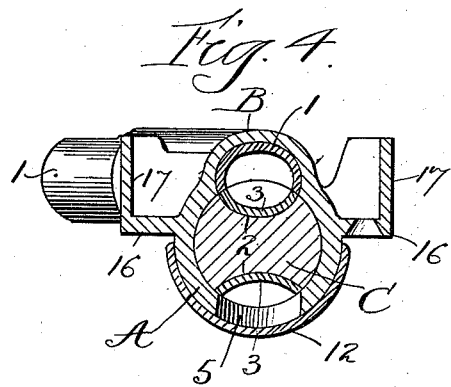
Witnesses
Inventor
Ernest Kruse
by Rudolph Wm. Lotz
Atty.

UNITED STATES PATENT OFFICE.

ERNEST KRUSE, OF CHICAGO, ILLINOIS.

DEVICE FOR DETECTING SEDIMENT IN PIPES.

SPECIFICATION forming part of Letters Patent No. 598,321, dated February 1, 1898.

Application filed December 10, 1896. Serial No. 615,224. (No model.)

*To all whom it may concern:*

Be it known that I, ERNEST KRUSE, a citizen of the United States, residing at Chicago, in the county of Cook and State of Illinois, have invented certain new and useful Improvements in Devices for Detecting Sediment in Pipes; and I do hereby declare the following to be a full, clear, and exact description of the invention, such as will enable others skilled in the art to which it appertains to make and use the same.

My invention relates to a novel construction in a device for detecting sediment in pipes, and is designed particularly for use on beer-pipes, the object being to produce a device of this character which can be sealed to prevent tampering therewith and which by a single turn without interrupting the flow of beer or other liquid will show the state of the pipe; and it consists in the features of construction and combinations of parts hereinafter fully described and claimed.

In the accompanying drawings, illustrating my invention, Figure 1 is a front elevation of a device for detecting sediment in pipes constructed in accordance with my invention. Fig. 2 is a longitudinal section on the line 2 2 of Fig. 1. Fig. 3 is a front elevation with the cover removed. Fig. 4 is a transverse section on the line 4 4 of Fig. 3.

Referring now to said drawings, A indicates a valve-casing of ordinary construction with which a pipe B is cast in one piece and extends at an angle of forty-five degrees to the longitudinal axis of said casing A, intersecting it in such a manner that a pipe 1, passed through said portion B, will extend half-way into the opening in said valve-casing. The pipe 1 is usually of zinc and is passed through said pipe B. The valve-casing A is then bored out, thus cutting away the inwardly-projecting portion of said pipe 1 and leaving its edges flush with the inner face of said valve-casing. The said pipe 1 is then removed and the valve C inserted in said valve-casing and bored out on both sides by turning one hundred and eighty degrees after one side has been bored to cut recesses 2 in said valve, which will be flush with the inner face of said pipe B when in place. This is done by inserting the drill through said pipe B, and thus cutting away the projecting portion of said valve C. Sections 3 of said zinc pipe are then soldered into the recesses 2 in said valve C, which will be flush with the pipe 1 and fill out the cut-away portion of the same when it is again inserted in place and soldered, as at 4. Said valve-casing A is provided on its front face with a recess or opening 5, at which the recesses 2 may be examined. As said sections 3 are of the same material and form a section of the pipe 1 when in place the sediment adhering to the interior of said pipe will adhere equally to said sections, so that by turning said valve C half around said section which has formed a section of the pipe will become visible and will show the condition of the pipe. This movement of the valve will, however, bring the other section 3 in place in said pipe 1, and thus permit the uninterrupted flow of beer during the examination of the first-named section. At its upper end said valve-casing A is cut away, as at 6, to form two shoulders 7, diametrically opposite each other, which are adapted to be engaged by a pin or stop 8 on said valve C to limit the movement of said valve. Said valve C is provided with a square stem 9, provided with an opening 10, through which a seal-wire 11 is adapted to be passed to prevent the removal of the cover 12, which also locks said valve so that it cannot be turned without removing said cover, and thus prevents tampering with said valve to deceive the Government inspector. Said cover 12 consists of a metallic shield adapted to fit over said casing A and cover the front half of the same, and is provided at its lower end with a lug or hook 13, adapted to pass through an opening in the lug 14 on the lower end of said casing A. At its upper end said cover 12 is provided with a loop 15, which is adapted to fit and extend over about one-half of said valve-stem 9 rearwardly of said opening 10 therein, so that when said seal-wire 11 is passed therethrough it will be impossible to remove said cover without cutting said wire. Said casing A is provided on each side adjacent said pipe B with ears or projections 16, which are provided with flanges 17, adapted to abut against a wall or the like, and with openings 18, through which screws are adapted to pass by means of which the device is secured to the wall. One end of said pipe 1 is adapted to be connected with the source of supply of beer, and the other end with the faucet.

I claim as my invention—

In a device of the kind specified, a valve-casing, a pipe integral therewith and intersecting said casing at an angle of forty-five degrees, a recess in said casing diametrically opposite said point of intersection of said pipe, and a valve adapted to fit said casing and provided with recesses adapted to be flush with the interior of said pipe, a stem on said valve, an opening in said stem, a cover adapted to be secured on said casing and to receive said stem, and a seal-wire adapted to be passed through said opening in said valve-stem to secure said cover against removal.

In testimony whereof I affix my signature in presence of two witnesses.

ERNEST KRUSE.

Witnesses:
RUDOLPH WM. LOTZ,
E. J. BOILEAU.